United States Patent [19]

Robello et al.

[11] Patent Number: 4,796,971

[45] Date of Patent: Jan. 10, 1989

[54] OPTICAL ARTICLE CONTAINING A POLYMERIC MATRIX EXHIBITING A HIGH LEVEL OF SECOND ORDER POLARIZATION SUSCEPTIBILITY

[75] Inventors: Douglas R. Robello, Webster; Abraham Ulman; Craig S. Willand, both of Rochester, all of N.Y.

[73] Assignee: Eastman Kodak Company, Rochester, N.Y.

[21] Appl. No.: 101,886

[22] Filed: Sep. 28, 1987

[51] Int. Cl.$^4$ .............................................. G02B 6/00
[52] U.S. Cl. ............................. 350/96.34; 350/96.29
[58] Field of Search ............... 350/96.10, 96.29, 96.30, 350/96.34

[56] References Cited

U.S. PATENT DOCUMENTS

| 4,431,263 | 2/1984 | Gavito | 350/96.34 |
| 4,539,061 | 9/1985 | Sagiv | 156/278 |
| 4,605,869 | 8/1986 | Choe | 307/425 |
| 4,659,177 | 4/1987 | Choe et al. | 350/96.34 |

OTHER PUBLICATIONS

D. J. Williams, "Organic Polymeric and Non-Polymeric Materials with Large Optical Nonlinearities", *Angew. Chem.* Int. Ed. Engl. 23 (1984), 690–703.

Zyss "Nonlinear Organic Materials for Integrated Optics", *Journal of Molecular Electronics,* vol. 1, pp. 25–45, 1985.

Singer, Sohn, and Lalama, "Second Harmonic Generation in Poled Polymer Films", *Appl. Phys. Lett.,* vol. 49, No. 5, 8/4/86, pp. 248–250.

D. S. Chemla and J. Zyss, *Nonlinear Optical Properties of Organic Molecules and Crystals,* vol. 1, pp. 280–282.

R. Rheinhardt, R. K. Tiwari, and T. P. Singh, "The Crystal Structure of Sulfisomidine", *Current Science,* vol. 49, p. 586, 1980.

Primary Examiner—William L. Sikes
Assistant Examiner—Robert E. Wise
Attorney, Agent, or Firm—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of organic polar aligned noncentrosymmetric molecular dipoles. The molecular dipoles form repeating units in a crosslinked polymeric matrix.

20 Claims, 2 Drawing Sheets

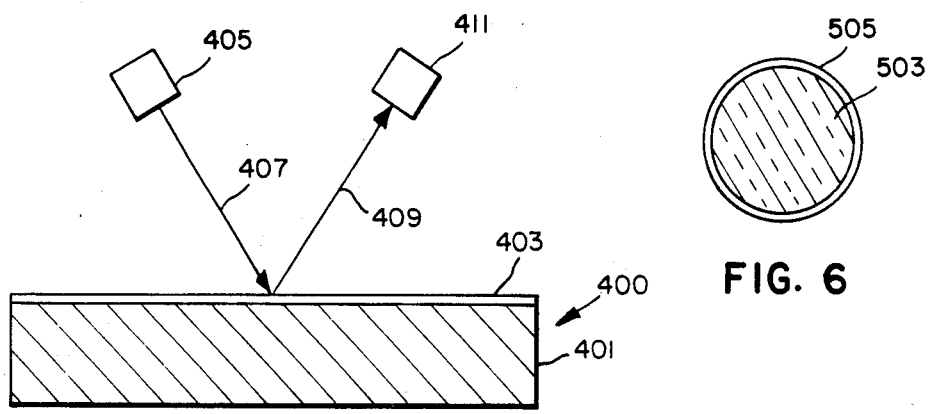
FIG. 4
FIG. 6
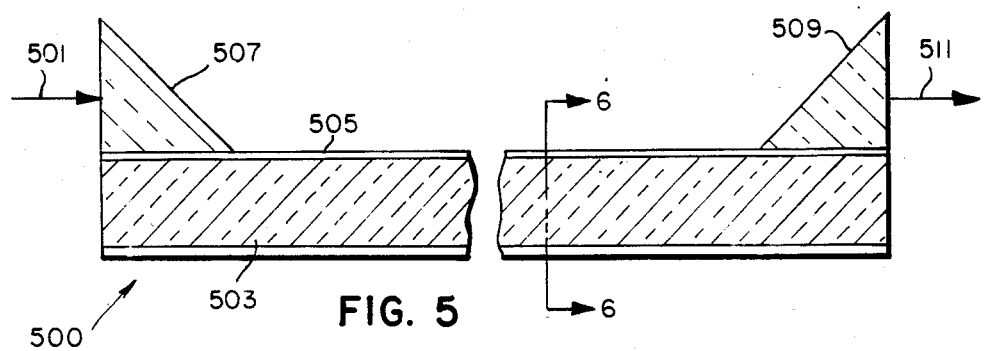
FIG. 5
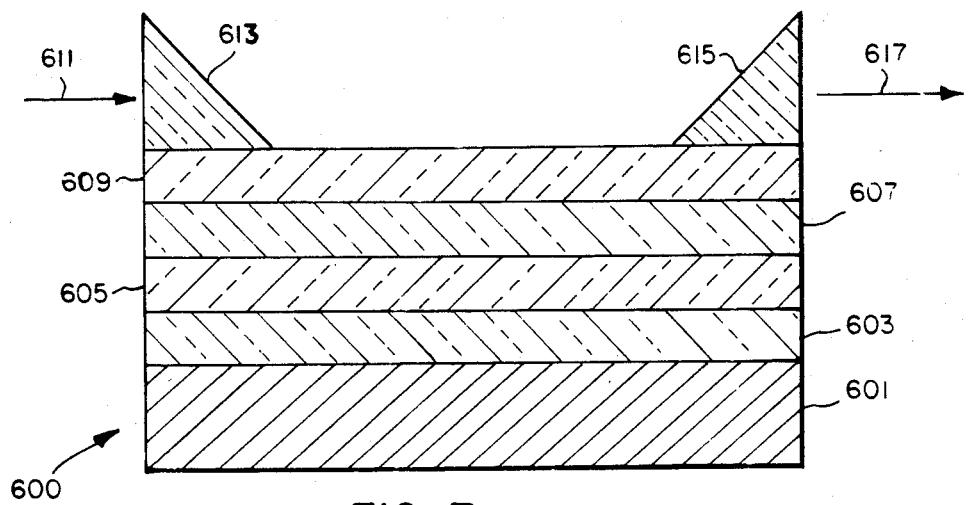
FIG. 7

OPTICAL ARTICLE CONTAINING A POLYMERIC MATRIX EXHIBITING A HIGH LEVEL OF SECOND ORDER POLARIZATION SUSCEPTIBILITY

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi E$, second order or first nonlinear polarization $\chi^{(2)} E^2$, and third order or second nonlinear polarization $\chi^{(3)} E^3$.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are allowed to align themselves in an electric field.

D. J. Williams, "Organic Polymeric and Non-Polymeric Materials with Large Optical Nonlinearities", *Angew. Chem.* Int. Ed. Engl. 23 (1984) 690–703, postulates mathematically and experimentally corroborates achievement of second order polarization susceptibilities $\chi^{(2)}$ using organic molecular dipoles equalling and exceeding those of conventional inorganic noncentrosymmetric dipole crystals, such a lithium niobate and potassium dihydrogen phosphate. To obtain the polar alignment of the organic molecular dipoles necessary to large values of $\chi^{(2)}$ Williams dispersed small amounts of the organic molecular dipoles as guest molecules in host liquid crystalline polymers. Upon heating the host polymers above their glass transition temperatures, poling in an externally applied electric field to produce the desired polar alignment of the molecular dipoles, and then cooling with the field applied, organic films with the measured levels of $\chi^{(2)}$ were obtained.

In addition Williams notes the fabrication of films with large values of $\chi^{(2)}$ using Langmuir-Blodgett (LB) film construction techniques, such as polydiacetylene chains formed by LB techniques. Williams further suggests the radiation patterning of these films.

Zyss "Nonlinear Organic Materials for Integrated Optics", *Journal of Molecular Electronics*, Vol. 1, pp. 25–45, 1985, though generally cumulative with Williams, provides a review of passive linear light guide construction techniques and elaborates on LB film construction techniques including radiation patterning, showing in FIG. 8 an LB film construction converted into a linear polymer.

Garito U.S. Pat. No. 4,431,263 discloses nonlinear optical, piezoelectric, pyroelectric, waveguide, and other articles containing a linear polymer of diacetylene.

Choe U.S. Pat. No. 4,605,869 discloses a laser frequency converter containing a linear polymer of the structure:

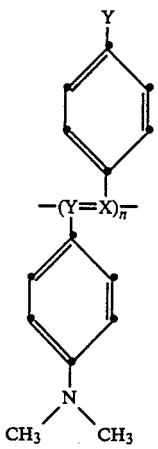

(1)

where n is an integer of at least 3 and Y is disclosed to be "nitro, cyano, trifluoromethyl, acyl, carboxy, alkanoyloxy, aroyloxy, carboxymido, alkoxysulfonyl, aryloxysulfonyl, and the like."

Singer, Sohn, and Lalama, "Second Harmonic Generation in Poled Polymer Films", *Appl. Phys. Lett.*, Vol. 49, No. 5, 8/4/86, pp. 248–250, discloses placing the azo dye Disperse Red in poly(methyl methacrylate), spin coating on a transparent electrode of indium tin oxide, overcoating with a thin layer of gold, raising the film above its glass transition temperature, applying a poling electric field, and then the film is cooled well below its glass transition temperature with the field applied.

Choe et al U.S. Pat. No. 4,659,177 discloses organic nonlinear optical media containing an organic molecular dipole. Both LB film assembly techniques and dispersal of the organic molecular dipole as a guest in a linear polymer host followed by heating above the glass transition temperature, poling in an electric field, and cooling with the field applied, are disclosed.

Sagiv U.S. Pat. No. 4,539,061 discloses a process for the formation of "self-assembled" films on substrates, where the term "self-assembled" is employed to indicate the film can be formed from successive monomolecular layers that are each spontaneously oriented on deposition. A first monolayer is formed by reacting with or adsorbing on the surface of a substrate a compound consisting of a hydrocarbon linking moiety joining a bonding group and a bonding group precursor. After the layer is deposited the bonding group precursor can be converted to a bonding group and the deposition procedure repeated.

Related Patent Applications

Optical articles containing a polar aligned organic molecular dipole containing a sulfonyl moiety as an electron acceptor are the specific subject matter of Ulman et al, "An Optical Article Exhibiting a High Level of Second Order Susceptibility", Ser. No. 101,888, concurrently filed and commonly assigned.

Optical articles containing polar aligned organic molecular dipoles as pendant groups of linear polymer repeating units are the subject of Robello et al, "An Optical Article Containing a Linear Polymer Exhibiting a High Level of Second Order Polarization Susceptibility", Ser. No. 101,884, concurrently filed and commonly assigned.

Optical articles containing molecular dipoles held in polar alignment by a crosslinked polymeric binder are the subject matter of Scozzafava et al, "AN OPTICAL ARTICLE CONTAINING A TRANSMISSION MEDIUM EXHIBITING A HIGH LEVEL OF SECOND ORDER POLARIZATION SUSCEPTIBILITY", Ser. No. 101,897, concurrently filed and commonly assigned.

SUMMARY OF THE INVENTION

It has been recognized that optical articles containing, for the transmission of electromagnetic radiation, a medium which exhibits a high second order polarization susceptibility provided by organic molecular dipoles offers the potential for performance advantages over corresponding optical articles employing conventional inorganic molecular dipoles, based on superior first hyperpolarizabilities $\beta$, higher transparencies, and greater adaptability of the organic molecular dipoles. To realize this potential fully, however, it is necessary to provide a transmission medium in which organic molecular dipoles are arranged in stable polar alignment and exhibit a high hyperpolarizability density ($\eta/V$, where V is the volume of medium).

The highest hyperpolarizability densities of polar aligned organic molecular dipoles have been achieved in Langmuir-Blodgett film constructions. Unfortunately, these are inherently disadvantageous, since they must be assembled by depositing successive monomolecular layers, making construction of all but thin layer transmission media time consuming and inconvenient. Additionally, LB films as desposited are readily damaged. This is particularly true of multilayer assemblies, which are often unstable. Although polymerization of LB films after assembly has been proposed, only reaction of the organic molecular dipoles within a single LB layer to form linear polymers has been suggested.

The monomolecular deposition of LB film assemblies can be avoided by poling organic molecular dipoles through the application of an externally applied DC field. Unfortunately, poling techniques heretofore taught by the art have resulted in significant reductions in the hyperpolarizability density $\beta/V$ of the transmission medium.

When organic molecular dipoles are dispersed in linear polymers, such as liquid crystals, the solubility of the molecular dipole is limited. Rarely can concentrations of the organic molecular dipole approaching 20 percent by weight be realized. Heating of linear polymers above their glass transition temperatures to allow polar alignment of the molecular dipoles inherently increases random kinetic motion tending to offset poling. Phase separation and thermal degradation of the heated materials are also matters of significant concern.

Finally, it is noted that to the extent polymeric matrices have been employed to hold organic molecular dipoles in polar alignment, the polymers have been linear polymers. While linear polymes can be solid in appearance, they are in reality viscous liquids. If the transmission medium is inadvertently reheated to or near the glass temperature of the linear polymer after poling, the polar alignment of the molecular dipoles is lost. Further, the molecular dipoles retain some freedom for rearrangement in linear polymer matrices even at lower temperatures. This is a matter of significant concern, since in many applications optical articles become internally heated by energy dissipation during the transmission of electromagnetic radiation.

In one aspect this invention is directed to an optical article containing, for the transmission of electromagnetic radiation, a medium exhibiting a second order polarization susceptibility greater than $10^{-9}$ electrostatic units comprised of organic polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment. The molecular dipoles are characterized in that the molecular dipoles form repeating units in a crosslinked polymeric matrix.

BRIEF DESCRIPTION OF THE DRAWINGS

FIG. 4 is an alternative form of a second harmonic generating optical artical.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
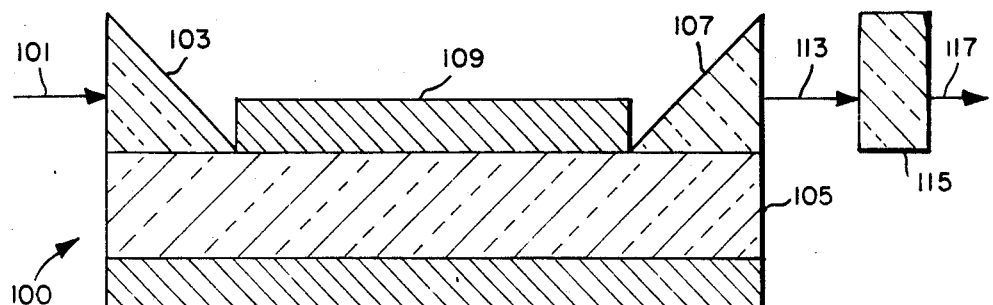
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional guiding elements 109 and 111 above and below the transmission medium. The guiding elements can minimize radiation loss by being chosen to exhibit a lower refractive index than the transmission medium. Additionally or alternatively, the guiding elements can be chosen to be reflective to the electromagnetic radiation.

When the transmission medium is constructed according to the requirements of the invention, specifically described below, at least a portion of the electromagnetic radiation entering the transmission medium will be alterred in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. The electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
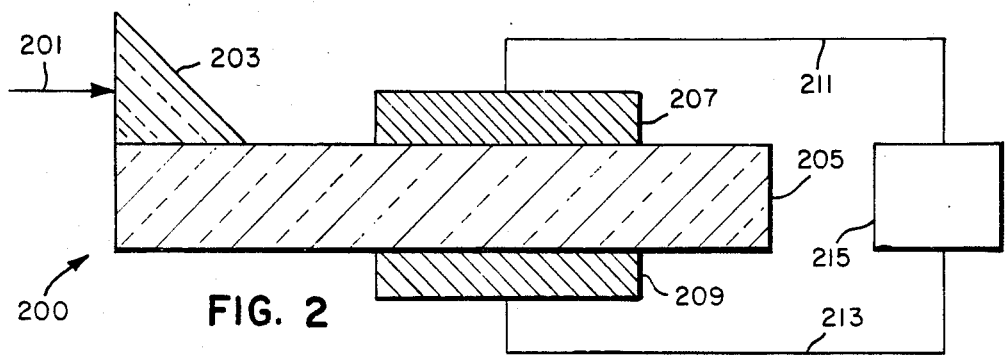
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the the presence or absence of electromagnetic radiation in the transmission medium. Alternatively, the electronic response unit can provide an analog response indicative not only of the presence, but also the intensity or wavelength of electromagnetic radiation in the transmission medium.

Figure 3:
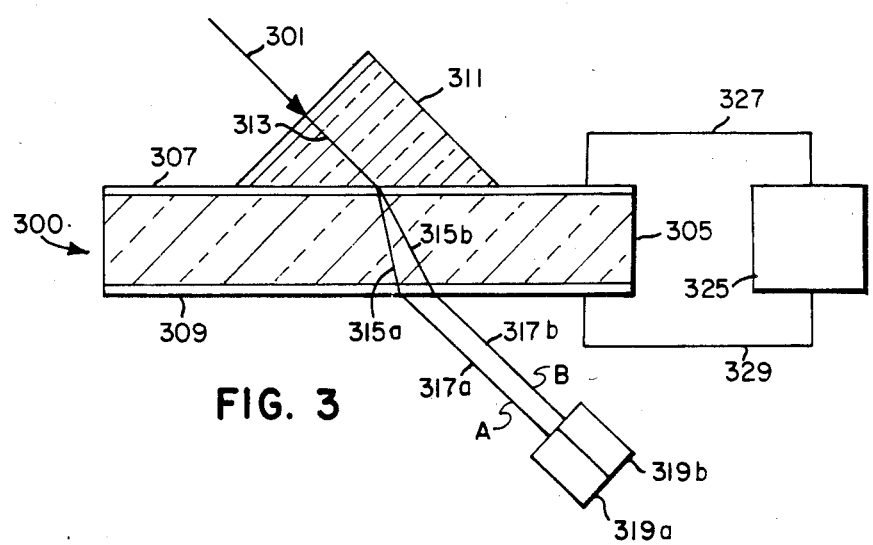
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source 325 is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, a sensor with a broader frequency band of response can be employed in combination with one or more filter elements, as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization.

Means 507, shown as a prism, is provided to introduce the input electromagnetic radiation into the waveguide. Means 509, shown as a prism, is provided to retrieve electromagnetic radiation from the waveguide. Although the optically active transmission medium is shown interposed between the input and output prisms, it is appreciated that an interposed layer is not required in these locations.

As the input electromagnetic radiation traverses the waveguide, a portion of the radiation will impinge on the surrounding layer of the optically active transmission medium and be refracted back into the waveguide. To avoid escape of electromagnetic radiation a reflective layer, not shown, can be coated over the optically active transmission medium. Successive impingements of transmitted radiation on the optically active medium result in measurable parametric effects, such as second harmonic generation.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarizaiton effects can be applied to the practice of this invention and are here incorporated by reference.

An essential component of each of the optical articles of this invention is an optically active transmission medium exhibiting a second order polarization susceptibility greater than $10^{-9}$ (preferably greater than $10^{-8}$) electrostatic units containing polar aligned molecular dipoles crosslinked to form a polymeric matrix. The molecular dipoles are comprised of an electron acceptor moiety bonded to an electron donor moiety by a linking moiety providing a conjugated $\pi$ bonding system to permit oscillation of the molecular dipole between a ground state exhibiting a first dipole moment and an excited state exhibiting a differing dipole moment. The molecular dipoles are represented in formula pairs by the oscillation (resonance) ground state and excited state extremes, since these lend themselves to representation by chemical formulae. Formula pairs are useful in bracketing the range of structural variance, even though it is recognized that in practice neither of the oscillation extremes may be actually fully realized. The molecular dipoles of this invention are generally represented by Formula Pair 3.

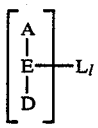

(3)

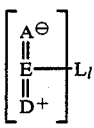

where
A is an electron acceptor moiety;
D is an electron donor moiety;
E is a linking moiety, specifically a conjugated π bonding system, which provides a pathway for charge transfer resonance;
l is an integer of from 1 to 4; and
L is a crosslinking moiety.

For convenience the molecular dipoles are named using their ground state structures, unless otherwise noted.

The electron acceptor moiety A can take any convenient conventional form. For example, the electron acceptor moiety can be an oxo, cyano, or nitro moiety, as disclosed by Williams, cited above. In a specifically preferred form of the invention the electron acceptor moiety A is a sulfonyl moiety. Optical articles containing a polar aligned organic molecular dipole containing a sulfonyl moiety as an electron acceptor are the specific subject matter of Ulman et al, "An Optical Article Exhibiting a High Level of Second Order Susceptibility", Ser. No. 101,888, concurrently filed and commonly assigned. When the electron acceptor moiety is a sulfonyl moiety, it can be represented by Formula Pair 4:

(4)

where
$R^1$ is an optionally substituted hydrocarbon moiety, with one of the substituents optionally being a crosslinking moiety L.

The electron donor moieties can take any convenient conventional form. The electron donor moiety can be an amino moiety. Primary, secondary, and tertiary amino moieties are contemplated for use, with the latter being most preferred and the former being least preferred. Only the secondary and tertiary amino moieties allow for substituent modification of properties through optional substitution of a hydrocarbon moiety similarly as the sulfonyl moiety, and only the tertiary amino moiety produces the most highly polar excited state. When the electron donor moiety, it can be represented by Formula Pair 5.

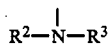

(5)

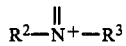

where
$R^2$ and $R^3$ are independently L, hydrogen, or optionally substituted hydrocarbon moieties.

Instead of employing an amino group as an electron donor moiety, it is specifically contemplated to employ an oxy or thio electron donor moiety. When such oxy and thio electron donor moieties can be represented by Formula Pair 6.

(6)

where
$R^4$ is an optionally substituted hydrocarbon moiety, with one of the substituents optionally being one of the crosslinking moieties L and
X is oxygen or sulfur.

The moiety E linking the electron acceptor and donor moieties is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, the linking moiety is chosen to permit efficient oscillation or charge transfer resonance between the ground and excited states. This results in large differences between the excited state and ground state dipole moments.

A conjugated π bonding system can satisfy all three requirements. On its most elemental level such a bonding system can be provided by chains of methine (a.k.a., methenyl and methylidyne) groups, which are (except as specifically noted) to be understood as including substituted forms. Such chains can optionally include one or more aza (—N═) moieties.

To satisfy the requirement for oscillation or charge transfer resonance, it is essential that the resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density, defined above, as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

In a preferred form the linking moieties can be represented by Formula Pair 7.

(7)

where
G is independently in each occurrence methine or aza and
m is 4 to 20, preferably 8 to 14.

For synthetic convenience it is generally preferred that no more than two adjacent G groups be aza groups. Thus, both individual aza (—N═) and diazo (+N═N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

In a specific preferred form of the invention the electron acceptor moiety A and the adjacent terminal portion of the linking moiety E can be represented by Formula Pair 8.

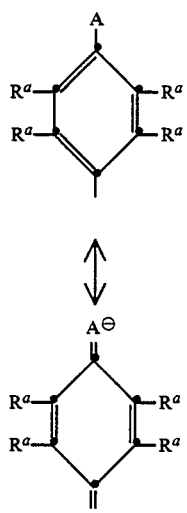

(8)

where
A is an electron acceptor moiety and
$R^a$ represent hydrogen, substituents which together with the electron acceptor moiety collectively enhance the electron acceptance of the phenyl ring to which they are attached, optionally including substituents, such as hydrocarbon substituents, which are in turn substituted with a crosslinking moiety L, or a combination thereof.

When the electron acceptor moiety is a sulfonyl moiety $SO_2R^1$ and the adjacent atom of the linking moiety is an aza (—N═) group, the sulfonyl and aza groups in combination form a sulfonimino group ═N—$SO_2R^1$. In a specific preferred form of the invention the terminal sulfonimino group and an adjacent aromatized portion of the linking group can be represented by Formula Pair 9.

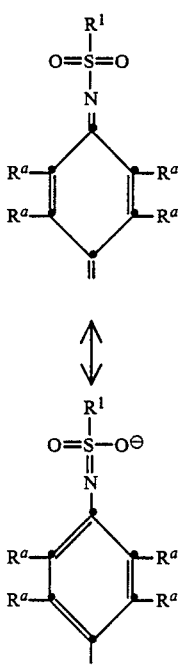

(9)

where $R^a$ and $R^1$ are as previously defined.

In a specific preferred form of the invention the electron donor moiety D and the adjacent terminal portion of the linking moiety E can be represented by Formula Pair 10.

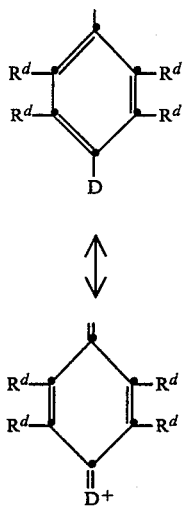

(10)

where
D is an electron donor moiety and
$R^d$ represent hydrogen, substituents which together with the electron donor D collectively enhance the electron donation of the phenyl ring to which they are attached, optionally including substituents, such as hydrocarbon substituents, which are in turn substituted with a crosslinking moiety L, or a combination thereof.

When electron donation is from a nitrogen atom, a terminal aromatic rigidizing ring system formed by a 4-pyridinium and 4-pyrido tautomer is possible, as illustrated by the preferred dipolar compounds of Formula Pair 11.

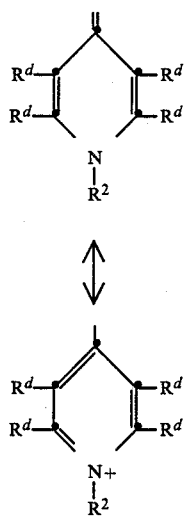

(11)

where $R^d$ and $R^2$ are as previously defined.
In specifically preferred forms of the molecular dipoles the linking moiety is aromatized adjacent both the electron acceptor moiety, as indicated by Formulae 8 and 9, and the electron donor moiety, as indicated by Formulae 10 and 11.

A specifically preferred class of molecular dipoles satisfying the requirements of the invention are crosslinked 4-A-4'-D-stilbenes, where A and D are as previously defined. In these stilbenes the electron acceptor sulfonyl and electron donor moieties are each bonded to one terminal aromatized portion of the conjugated $\pi$ bonding linking moiety, with the aromatized portions of the linking moiety being joined by an ethylene (vinylene) group. When the single ethylene linking group of the stilbene is replaced by two or more ethylene groups, within the resonance path chain length limits noted above, highly advantageous analogues are realized. Substitution of individual methine groups with aza groups, particularly in the ethylenic portion of the linkage, are compatible with achieving high $\beta$ values. The ethylenically expanded and aza substituted stilbene variants are hereinafter referred to as stilbenoid compounds, since they are compounds which share significant property similarities with stilbenes.

In a preferred form of the invention, the stilbenes and stilbenoid compounds can be presented by Formula Pair 12:

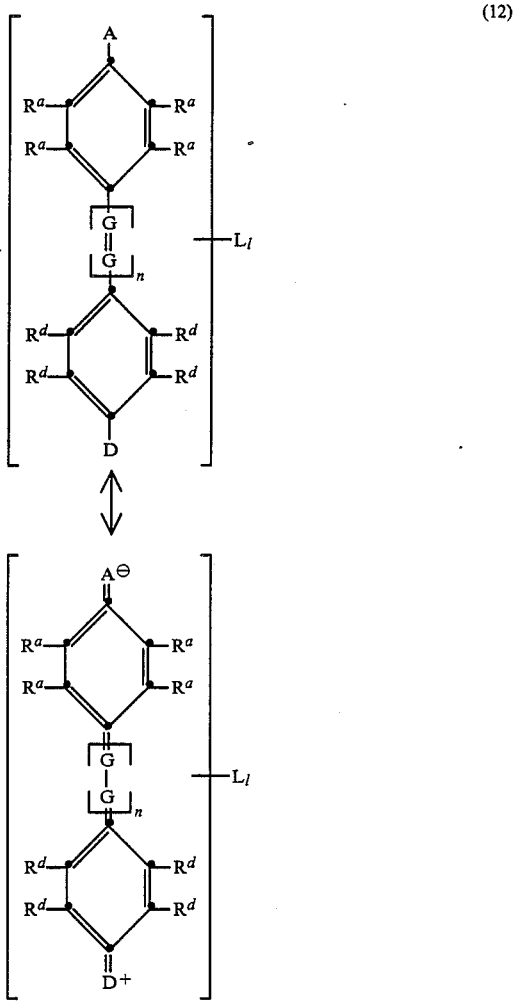

(12)

where
A, D, l, L, $R^a$, and $R^d$ are as previously defined;
D is an electron donor moiety;

G is independently in each occurrence a methine or aza moiety, with the proviso that no more than two aza moieties are next adjacent; and n is an integer of from 1 to 3.

A sulfonimino group is incompatible with the stilbenoid structures of Formula Pair 12, One preferred class of dipolar compounds exhibiting high levels of hyperpolarizability incorporating a terminal sulfonimino group are represented by Formula Pair 13.

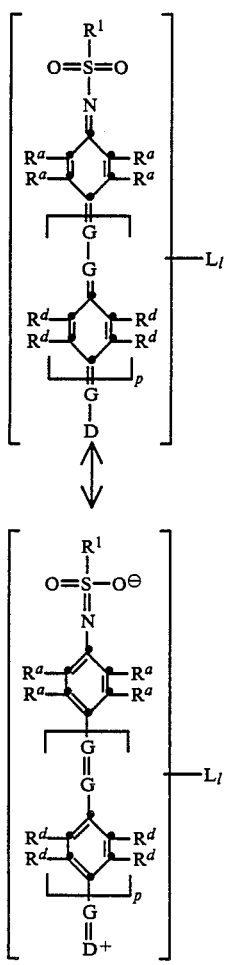

(13)

where

D, l, L, $R^1$, $R^a$, and $R^d$ are as previously defined;

G is independently in each occurrence a methine or aza moiety, with the proviso that no more than two aza moieties are next adjacent; and p is 0 or 1.

In Formula Pair 13 neither of the two terminal resonance path atoms of the linking moiety are included in a rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of Formula Pair 14.

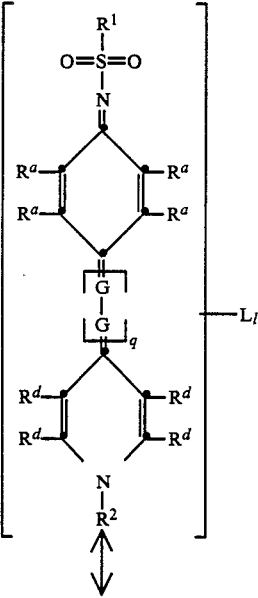

(14)

where l, L, $R^1$, $R^2$, $R^a$, and $R^d$ are as previously defined;

G is independently in each occurrence a methine or aza moiety, with the proviso that no more than two aza moieties are next adjacent; and q is an integer of from 0 to 3.

When the linking moiety contains two or more aromatic rings, it is specifically preferred that they be coplanar, since coplanarity achieves the highest hyperpolarizability densities. To preserve the coplanarity of the rings it is preferred that any intermediate methine groups which are not part of an aromatic ring remain unsubstituted. However, sterically compact methine substituents compatible with copolanarity, such as fluorine and lower alkyl groups of from about 1 to 3 carbon atoms, are contemplated.

Where the electron donor and/or electron acceptor moieties are relied upon for crosslinking of the molecular dipoles, the aromatic rings of the linking moiety can be left unsubstituted while achieving high levels of performance. In other instances it may be synthetically convenient to employ the aromatic rings of the linking moiety as sites for crosslinking the molecular dipoles. In either instance, it is appreciated that the dipole moment a molecular dipole can be increased by employing in available phenylene ring positions substituents which supplement the electronic asymmetry induced by the electron acceptor A moiety and the electron donor moiety D. Electron donating and accepting properties of phenyl rings imparted by substitution have been extensively studied and quantified by the assignment of Hammett sigma values. Substituents which render phenyl rings electron accepting are assigned positive Hammett sigma values while negative Hammett sigma values are assigned to substituents which render phenyl rings electron donating. Hydrogen atoms attached to phenyl rings are assigned a Hammett sigma value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-135 to 3-138, here incorporated by reference, lists Hammett sigma values for a large number of commonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\sigma=-0.07$, ethyl $\sigma=-0.07$, n-propyl $\sigma=-0.05$, i-propyl $\sigma=-0.07$, n-butyl $\sigma=-0.07$, and sec-butyl $\sigma=-0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, $\alpha$-naphthyl, and $\beta$-naphthyl groups are contemplated (e.g., phenyl $\sigma=+0.06$). Other useful and specifically contemplated hydrocarbon substituents include alkaryl substituents (e.g., p-methylphenyl), aralkyl substituents (e.g., benzyl $\sigma=-0.05$ and phenethyl), alkenyl substituents (e.g. vinyl $\sigma=+0.02$), aralkenyl substituents (e.g., 2-phenylvinyl $\sigma=+0.14$), alkynyl substituents (e.g., ethynyl $\sigma=+0.21$, propargyl, and 2-butynyl), and aralkynyl substituents (e.g., phenethynyl $\sigma=+0.14$). Substituted hydrocarbon substituents are also contemplated, such as haloalkyl substituents (e.g., bromomethyl, chloromethyl $\sigma=-0.12$, fluoromethyl, and iodomethyl), haloaryl substituents (e.g., p-bromophenyl, m-bromophenyl, and p-chlorophenyl, and hydroxyalkyl substituents (e.g., hydroxymethyl $\sigma=+0.08$).

It is specifically preferred to select $R^a$ substituents independently from among known phenyl ring substituents having a positive Hammett sigma value and to select $R^d$ substituents independently from among known phenyl ring substituents having a negative Hammett sigma value. However, it is recognized that combinations of $R^a$ substituents are possible, some of which are electron donating, some of which are essentially neutral, and some of which are electron accepting. Combinations of $R^a$ substituents are possible which, together with the electron acceptor moiety A, algebraically sum to a positive net Hammett sigma value. Preferably the combination of $R^a$ substituents, without inclusion of the sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the electron acceptor moiety, and no one $R^d$ substituent should have a Hammett sigma value more negative than that of the electron donor moiety D. It is also important to bear in mind that large $\beta$ values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on electronic asymmetry. It is further recognized that $R^2$, $R^3$, and $R^4$ can, if desired, form with an $R^d$ substituent ortho to D a fused ring, preferably of 5 or 6 member ring. For example, the amino electron donor moiety in Formula Pair 11 can form with the linking moiety a julolidene ring. Numerous other fused rings containing the heteroatom of the electron donor moiety are possible. However, while within the contemplation of useful dipole molecular structures, fused ring substituent patterns are not generally preferred, since they increase molecular bulk, thereby reducing the hyperpolarizability density, while lacking in many instances the synthetic convenience of monovalent substituents.

The substituents $R^1$ and $R^4$ are optionally substituted hydrocarbon substituents in all instances, while the substitutents $R^2$ and $R^3$ can be hydrogen or optionally substituted hydrocarbon substituents, with one or both most preferably being optionally substituted hydrocarbon substituents. Specifically contemplated forms of hydrocarbon substituents are aliphatic hydrocarbon substituents containing from 1 to about 40 (preferably 1 to 10 carbon atoms and optimally 1 to 6) carbon atoms—e.g., alkyl, alkenyl, and alkynyl, including all cyclic forms thereof; aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl; etc. The aliphatic substituents and substituent moieties can contain unsaturation for steric or synthetic convenience. All of the hydrocarbon substituents can, optionally, themselves be substituted or facilitate polar alignment in the transmission medium. Any one or combination of the hydrocarbon substituents can be substituted with the crosslinking moiety L.

The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents. For example, the Hammett sigma values of a primary amino group ($-NH_2$); second amino groups, such as alkyl-amino (e.g., $-NHCH_3$, $-NHCH_2CH_3$, and $-NH-n-C_4H_9$); and tertiary amino groups, such as dialkylamino (e.g., dimethylamino) range from $-0.04$ for the primary amino group to $-0.83$, with the secondary and tertiary amino groups generally having Hammett sigma values more negative than $-0.20$.

For the molecular dipoles to form a crosslinked polymeric matrix it is necessary that they be linked in polar alignment to at least three adjacent molecular dipoles. For this to be achieved each molecular dipole requires at least one crosslinking moiety L. Where a single crosslinking moiety is provided for each molecular dipole, the crosslinking moiety must itself be capable of linking at least three adjacent molecular dipoles in order to form a crosslinked polymeric matrix. A siloxy ($SiO_3$) group is an example of a preferred moiety capable of crosslinking three adjacent molecular dipoles through oxy ($-O-$) linkages. Where two or more crosslinking moieties are provided, the preferred crosslinking moieties are obtained from activated vinyl groups. By reacting activated vinyl groups crosslinking moieties are produced which form a polymeric backbone to which the remainder of the molecular dipole is linked as a pendant group. By providing two or more crosslinking moieties the molecular dipoles join in forming two or more polymeric backbones and hence a crosslinked polymeric matrix.

The exact form of the molecular dipole polymeric matrix chosen will depend to some extent upon the approach taken to form an optically active transmission medium. The following preferred approaches are selected in part to show the diversity of forms the molecular dipole containing polymeric matrix can take.

One approach to forming optically active transmission layers satisfying the requirements of the invention can be practiced by producing self-assembled films. The term "self-assembled" is employed to indicate that the film can be formed from successive monomolecular layers that are each spontaneously oriented on deposition. One technique for forming optically active self-assembled films satisfying the requirements of this invention can be practiced by modifying the teachings of Sagiv U.S. Pat. No. 4,539,061, here incorporated by reference. Sagiv teaches to form layers on substrates by sequential deposition. A first monomolecular layer is formed by reacting with or adsorbing on the surface of a substrate a compound consisting of a hydrocarbon linking moiety joining a bonding group and a bonding group precursor. The first layer is deposited on the substrate in a spatially oriented manner with the bonding groups adsorbed or bonded to the substrate surface and the bonding group precursors remote from the substrate surface. After the first layer is formed, the bonding group precursors remote from the substrate surface are modified so that they can provide bonding sites. A second layer can now be formed on the first layer similarly as the first layer is deposited on the substrate. After the second layer is formed, the coating sequence can be again repeated, if desired, until a film of the desired thickness is realized.

One very significant difference between the self-assembled films of this invention and those disclosed by Sagiv is that instead of a hydrocarbon linking moiety, as taught by Sagiv, this invention employs two hydrocarbon moieties, one forming a part of the sulfonyl electron acceptor moiety and the other forming a part of the electron donor moiety, wherein one of the hydrocarbon moieties is substituted with a bonding group and the other is substituted with a bonding group precursor. The entire molecular dipole molecule employed to form a self-assembled film can be described by Formulae 15 or 16:

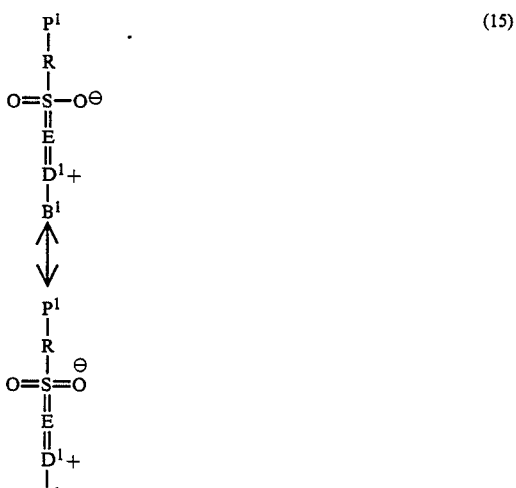

(15)

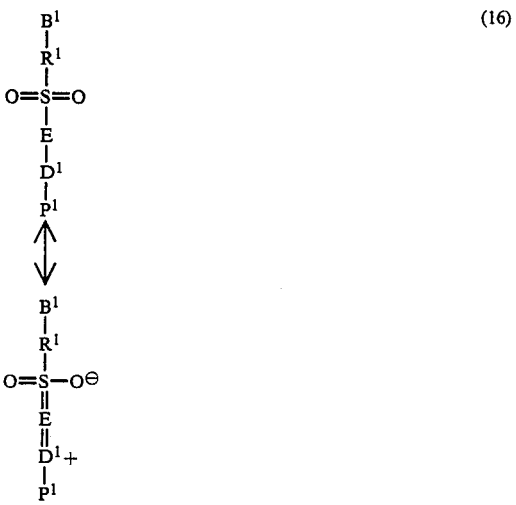

(16)

where

E is a linking moiety as previously described;

$D^1$ is an electron donor moiety, such as $-NR^2R^3$ or $-XR^4$, previously described, where at least one of $R^2$, $R^3$, or $R^4$, when present, is an optionally substituted hydrocarbon group as described above further substituted with $B^1$ or $P^1$;

$B^1$ is a bonding group; and $P^1$ is a bonding group precursor.

Of the various bonding groups described by Sagiv, cited above, those which are capable of crosslinking at least three adjacent molecular dipoles can be employed.

Silane moieties, such as trichlorosilanes, are particularly suited for this purpose.

Sagiv discloses a large variety of bonding group precursors and varied techniques for their conversion to bonding groups. Such bonding group precursors and conversion techniques can be employed to the extent that they are compatible with the preservation of the molecular dipole. In general, however, the draconian approaches (e.g., ozonolysis) suggested by Sagiv are incompatible with preservation of the molecular dipoles of this invention.

In a preferred form $P^1$ can take the form of a precursor that can be hydrolyzed under relatively mild conditions to provide a hydroxy functional group. Many of the conventional techniques for forming alcohols can be employed. For example, when the bonding group precursor is a halide substituent, the halide can be readily displaced by hydrolysis to provide a hydroxy group. Ester, amide, alkylthio, arylthio, aryloxy, and alkoxy groups can also be readily hydrolyzed by known techniques to create a hydroxy substituent on the hydrocarbon of the molecular dipole.

In a specifically preferred form of the invention the substrate chosen for the construction of self-assembled film is an optically transparent siliceous support, such as quartz or glass. Siliceous supports are known to exhibit hydroxyl groups at their surface. A monomolecular layer of a compound satisfying Formula 15 or 16 is spread on the siliceous substrate. The preferred bonding group is —SiCl$_3$. Reaction of the bonding group with the substrate in the presence of water produces a first layer of the following structure:

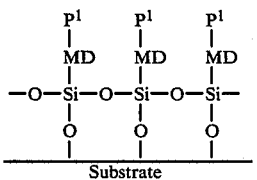

where

MD represents —R$^1$—SO$_2$—E—D— defined above in connection with Formulae 15 and 16 and $P^1$ is preferably a bonding group precursor that can be employed to form a hydroxy group by hydrolysis. The MD moiety can be oriented with either the electron acceptor or donor moiety nearest the support.

When the bonding group precursor is converted to a hydroxy group, a second layer similar to the first can be formed on the substrate. By repeating this sequence of steps any desired number of layers can be formed. The following illustrates a preferred self-assembled film formed by three successive depositions:

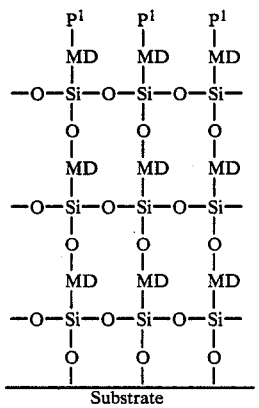

In this form of the invention the crosslinking moieties L take the form of oxy (—O—) linkages. Note that adjacent molecular dipoles share a common oxy linkage. It is immaterial whether $P^1$ in the final layer remains as a bonding group precursor or is converted to a hydroxyl group.

Although optically active transmission layers are useful containing a single aligned MD layer, it is preferred to construct optical articles according to this invention with at least 50 superimposed MD layers, most preferably at least a 100 layers. The layers superimposed can range as high as 5000 or more. In practice usually up to about 1000 layers are laid down to form an optically active transmission medium. Self-assembly deposition techniques are preferred for the fabrication of optically active transmission films having thicknesses ranging up to about 2000 Å.

Where relatively thick optically active elements, such as those greater than about 2000 Å in thickness and particularly those greater than 1 μm in thickness, are desired, forming the optically active layer in successive monomolecular deposition sequences can be time consuming. Therefore thicker optically active elements according to the invention are preferably constructed by macroscopic construction techniques—that is, construction techniques that are capable of forming many or all molecular layers of the optically active element simultaneously and therefore do not require repetition as a function of the number of molecular layers.

One preferred macroscopic construction approach is to pattern (e.g., spin cast or otherwise suitably shape) a fluid containing the molecular dipole in an unordered state, align (pole) the molecular dipoles in an externally applied electric field, and convert the fluid to a rigid crosslinked polymeric matrix capable of holding the molecular dipoles in polar alignment when the external field is no longer present. A number of different variations on this general approach are possible.

A preferred approach for achieving macroscopic construction of an optically active transmission medium is to employ molecular dipoles which are monomers each containing two or more photopolymerizable substituent groups. Flexible linkages are required in the molecule so that the photopolymerizable substitutent groups are allowed freedom of orientation while the molecular dipole remains in polar alignment with the externally applied electric field. Exemplary forms of molecular dipole repeating units derived from dipole monomers containing two polymerizable substituent groups are illustrated by Formula Pairs 17 through 28.

Dipole monomers containing three or four photopolymerizable substitutent groups differ from those illustrated only by the number of substituent groups present which are substituted by crosslinking groups.
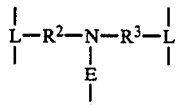 (17)
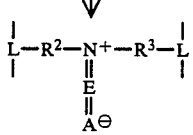
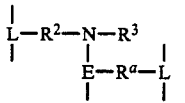 (18)
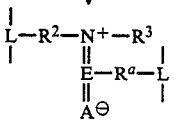
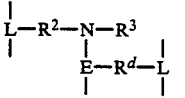 (19)
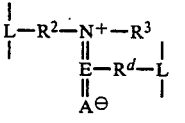
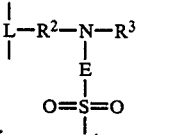 (20)
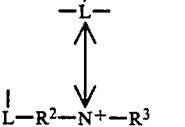
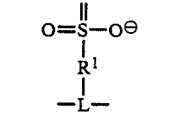
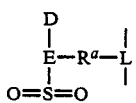 (21)
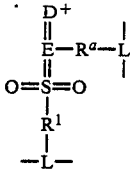
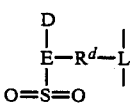 (22)
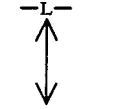
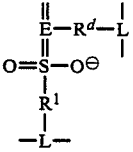
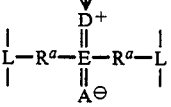 (23)
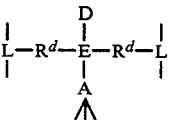
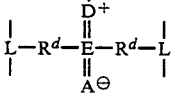 (24)

-continued

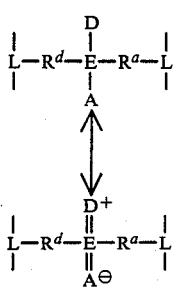
(25)

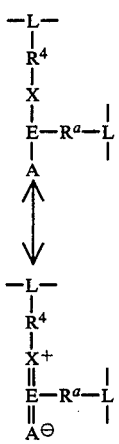
(26)

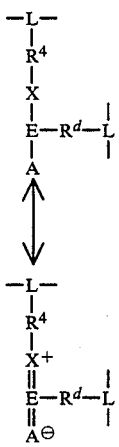
(27)

-continued

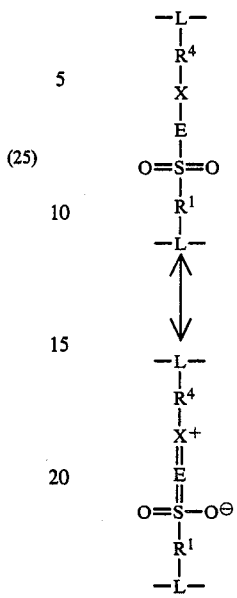
(28)

where

A, E, D, and L are as previously defined and
$R^a$, $R^d$, $R^1$, $R^2$, $R^3$, and $R^4$ are moieties satisfying the requirements previously described, but in this instance when L substituted further chosen from among these moieties which are capable of acting as flexible spacers allowing the precursor of the photocrosslinking moiety to orient itself spatially in relation to the remainder of the dipole monomer prior to polymerization.

In a preferred form the flexible spacer is an optionally substituted hydrocarbon moiety, such as an alkylene group, containing from 2 to 10 carbon atoms, preferably 4 to 8 carbon atoms. While the alkylene chain link can be extended to 20 or even 40 carbon atoms, it is generally preferred to restrict the size of the spacer moiety to avoid reduction of the hyperpolarizability density. In a specifically preferred form the spacer moiety is a —(CH$_2$)$_4$— group, where r is 2 to 10, preferably 4 to 8.

In a preferred form form the photocrosslinking moiety L is derived from an activated vinyl group to satisfy Formula 29:

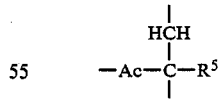
(29)

where

Ac is an activating moiety and
$R^5$ is hydrogen or a lower alkyl group of from 1 to 6 carbon atoms, preferably hydrogen or methyl. In a specific preferred form of the invention the activating moiety is a carboxy —C(O)O— moiety.

In a specific preferred form of the invention the crosslinking moiety L satisfies Formula 30:

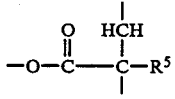
(30)

where
R[5] is as previously defined.

In a specifically preferred form of the invention the crosslinking moiety is an acrylate or methacrylate moiety.

The dipole monomers are liquids at room temperature that can be placed in a mold or cast on a support surface to provide the desired geometric form of the optically active transmission medium to be produced. Upon placing the liquid in its desired configuration in a electrical field, the dipole monomers arrange themselves in polar alignment with the applied field. Thereafter, with the field still applied, polymerization can be initiated to produce the desired crosslinked polymeric matrix.

Polymerization can be induced thermally by heating the poled dipole monomers. However, since heating increases the kinetic motion of the dipole monomers and therefore tends to reduce polar alignment, it is preferred to rely on electromagnetic radiation to initiate polymerization. By employing more highly energetic forms of electromagnetic radiation, such as shorter wavelength ultraviolet radiation, photopolymerization can be achieved in the absence of a polymerization initiator.

It is preferred to achieve photopolymerization by exposure of the medium containing the polar aligned (poled) dipole monomers to visible light or near ultraviolet (290 to 390 nm) radiation. Any convenient photopolymerization initiator can be employ for this purpose. In a specifically preferred form two coinitiators, an activator andd a photosensitizer are employed in combination. Any of the photosensitizer and initiators disclosed in Molaire U.S. Pat. No. 4,322,490, Molair et al U.S. Pat. No. 4,619,890, and Scozzafava et al U.S. Pat. No. 4,485,161, here incorporated by reference, can be employed in the practice of this invention.

Specht and Farid U.K. No. 2,083,832A, here incorporated by reference, discloses as coinitiators azinium activators and amino-substituted 3-ketocoumarin and naphthothiazole merocyanine photosensitizers which are useful in promoting photocrosslinking in the near UV and blue portions of the spectrum.

Preferred coinitiators for photocrosslinking by exposure of electromagnetic radiation of wavelengths longer than 400 nm are the specific subject matter of commonly assigned, copending filings, Farid et al U.S. Ser. Nos. 933,657; 933,658, 933,660, and 933,712, each filed Nov. 21, 1986. Farid et al teaches to employ azinium salt activators in combination with dye photosensitizers. The azinium salt activators can take any convenient conventional form. The azinium activators disclosed by Heseltine et al andd Jenkins et al U.S. Pat. Nos. Re. 27,922 and 27,925, Specht and Farid U.K. No. 2,083,,832A and Research Disclosure, Vol. 200, December 1980, Item 20036, cited above, provide a variety of examples of useful azinium activators.

The azinium activators include an azinium nucleus, such as a pyridinium, diazinium, or triazinium nucleus. The azinium nucleus can include one or more aromatic rings, typically carbocyclic armatic rings, fused with an azinium ring. In other words, the azinium nuclei include quinolinium, isoquinolinium, benzodiazinium, and naphthodiazonium nuclei. To achieve the highest attainable activation efficiencies per unit of weight it is preferred to employ monocyclic azinium nuclei.

The azinium activators include a quaternizing substituent, which is preferably an oxy (e.g., alkoxy or aryoxy) or acyl radical containing from 1 to 18, preferably 1 to 8 carbon atoms. The highest activity azinium salts are those containing an oxy quaternizing substituent containing 1 or 2 carbon atoms. Other substituents to the azinium ring are not required, but can be present.

The dye photosensitizers can be selected from among any known dye class, provided they exhibit a reduction potential which in relation to that of the azinium activator is at most 0.1 volt more positive. Among specifically contemplated dye classes from which dyes can be selected are coumarin (including ketocoumarin and sulfonocoumarin) dyes, merocyanine dyes, merostyryl dyes, oxonol dyes, and hemioxonol dyes. Dyes from each of the foregoing classes all contain a keto group in the blue absorbing chromophore and are all therefore designated keto dyes. In addition, it is a specific recognition of this invention that a dye photosensitizer useful in the practice of this invention need not be a keto dye. That is, a keto group in the blue absorbing chromophore of the dye is not essential. Non-keto dyes embrace a variety of dye classes, including non-keto polymethine dyes, rhodamine dyes, anthracene dyes, acridine dyes, aniline dyes, and azo dyes. Non-keto polymethine dyes include cyanine, hemicyanine, and styryl dyes.

In one preferred form of the invention the dye photosensitizers are chosen from the polymethine dye class, which includes the cyanines, merocyanines, complex cyanines and merocyanines (i.e., tri-, tetra- and polynuclear cyanines and merocyanines), oxonols, hemioxonols, styryls, merostyryls, and streptocyanines.

The cyanine dyes include, joined by a methine linkage, two basic heterocyclic nuclei, such as azolium or azinium nuclei, for example, those derived from pyridinium, quinolinium, isoquinolinium, oxazolium, thiazolium, selenazolium, indazolium, pyrazolium, pyrrolium, indolium, 3H-indolium, imidazolium, oxadiazolium, thiadioxazolium, benzoxazolium, benzothiazolium, benzoselenazolium, benzotellurazolium, benzimidazolium, 3H- or 1H-benzoindolium, naphthoxazolium, naphthothiazolium, naphthoselenazolium, naphthotellurazolium, carbazolium, pyrrolopyridinium, phenanthrothiazolium, and acenaphthothiazolium quaternary salts.

Exemplary of the basic heterocyclic nuclei are those satisfying Formulae 31 and 32.

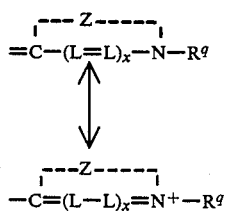

Formula 31

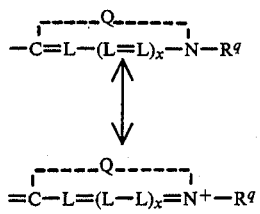

Formula 32 where
Z represents the elements needed to complete a cyclic nucleus derived from basic heterocyclic nitrogen compounds such as oxazoline, oxazole, benzoxazole, the naphthoxazoles (e.g., naphth[2,1-d]oxazole, naphth[2,3-d]oxazole, and naphth[1,2-d]oxazole), oxadiazole, thiazoline, thiazole, benzothiazole, the naphthothiazoles (e.g., naphtho[2,1-d]thiazole), the thiazoloquinolines (e.g., thiazolo[4,5-b]quinoline), phenanthrothiazole, acenaphthothiazole, thiadioxazole, selenazoline, selenazole, benzoselenazole, the naphthoselenazoles (e.g., naphtho[1,2-d]selenazole), benzotellurazole, naphthotellurazoles (e.g., naptho[1,2-d]tellurazole), imidazoline, imidazole, benzimidazole, the naphthimidazoles (e.g., naphth[2,3-d]imidazole), 2- or 4-pyridine, 2- or 4-quinoline, 1- or 3-isoquinoline, benzoquinoline, 3H-indole, 1H- or 3H-benzoindole, and pyrazole, which nuclei may be substituted on the ring by one or more of a wide variety of substituents such as hydroxy, the halogens (e.g., fluoro, chloro, bromo, and iodo), alkyl groups or substituted alkyl groups (e.g., methyl, ethyl, propyl, isopropyl, butyl, octyl, dodecyl, octadecyl, 2-hydroxyethyl, 3-sulfopropyl, carboxymethyl, 2-cyanoethyl, and trifluoromethyl), aryl groups or substituted aryl groups (e.g., phenyl, 1-naphthyl, 2-naphthyl, 4-sulfophenyl, 3-carboxyphenyl, and 4-biphenylyl), aralkyl groups (e.g., benzyl and phenethyl), alkoxy groups (e.g., methoxy, ethoxy, and isopropoxy), aryloxy groups (e.g., phenoxy and 1-naphthoxy), alkylthio groups (e.g., methylthio and ethylthio), arylthio groups (e.g., phenylthio, p-tolylthio, and 2-naphthylthio), methylenedioxy, cyano, 2-thienyl, styryl, amino or substituted amino groups (e.g., anilino, dimethylamino, diethylamino, and morpholino), acyl groups, (e.g., formyl, acetyl, benzoyl, and benzenesulfonyl);

Q represents the elements needed to complete a cyclic nucleus derived from basic heterocyclic nitrogen compounds such as pyrrole, indole, carbazole, benzindole, pyrazole, indazole, andd pyrrolopyridine;

$R^q$ represents alkyl groups, aryl groups, alkenyl groups, or aralkyl groups, with or without substituents, (e.g., carboxy, hydroxy, sulfo, alkoxy, sulfato, thiosulfato, phosphono, chloro, and bromo substituents);

L is in each occurrence independently selected to represent a substituted or unsubstituted methine group—e.g., —$CR^5$= groups, where $R^5$ represents hydrogen when the methine group is unsubstituted and most commonly represents alkyl of from 1 to 4 carbon atoms or phenyl when the methine group is substituted; and x is 0 or 1.

Cyanine dyes can contain two heterocyclic nuclei of the type shown in Formula 16 joined by a methine linkage containing an uneven number of methine groups or can contain a heterocyclic nucleus according to each of Formulae 16 and 17 joined by a methine linkage containing an even number of methine groups, where the methine groups can take the form —$CR^1$= as described above. The greater the number of the methine groups linking nuclei in the polymethine dyes in general and the cyanine dyes in particular the longer the absorption wavelengths of the dyes. For example, dicarbocyanine dyes (cyanine dyes containing five methine grous linking two basic heterocyclic nuclei) exhibit longer absorption wavelengths than carbocyanine dyes (cyanine dyes containing three methine groups linking two basic heterocyclic nuclei) which in turn exhibit longer absorption wavelengths than simple cyanine dyes (cyanine dyes containing a single methine group linking two basic heterocyclic nuclei). Carbocyanine and dicarbocyanine dyes are longer wavelength dyes while simple cyanine dyes are typically yellow dyes, but can exhibit absorption maxima up to about 550 nm in wavelength with proper choice of nuclei and other components capable of bathochromically shifting absorption.

One of the techniques for bathochromically shifting the absorption maxima of polymethine dyes in general and cyanine dyes in particular is to include in the methine linkage an oxocarbon bridging nucleus. Exemplary oxocarbon bridging nuclei can take any of the forms indicated by Formula 33.

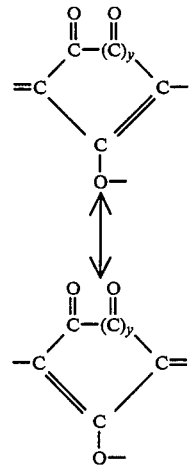

Formula 33 wherein y is the integer 0, 1, or 2.

Merocyanine dyes link one of the cyanine dye type basic heterocyclic nuclei described above to an acidic keto methylene nucleus through a methine linkage as described above, but containing zero, two, or a higher even number of methine groups. Zero methine dyes, those containing no methine groups in the linkage between nuclei, exhibit a double bond linkage between the nuclei in one resonance form and a single bound linkage in another resonance form. In either resonance form the linkage sites in the nuclei are formed by methine groups forming a part of each nucleus. Zero methine polymethine dyes are yellow dyes.

Exemplary acidic nuclei are those which satisfy Formula 34.

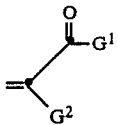

Formula 34 where
- G¹ represents an alkyl group or substituted alkyl group, an aryl or substituted aryl group, an aralkyl group, an alkoxy group, an aryloxy group, a hydroxy group, an amino group, or a substituted amino group, wherein exemplary substituents can take the various forms noted in connection with Formulae 1 and 2;
- G² can represent any one of the groups listed for G¹ and in addition can represent a cyano group, an alkyl, or arylsulfonyl group, or a group represented by

or G² taken together with G¹ can represent the elements needed to complete a cyclic acidic nucleus such as those derived from 2,4-oxazolidinone (e.g., 3-ethyl-2,4-oxazolidindione), 2,4-thiazolidindione (e.g., 3-methyl-2,4-thiazolidindione), 2-thio-2,4-oxazolidindione (e.g., 3-phenyl-2-thio-2,4-oxazolidindione), rhodanine, such as 3-ethylrhodanine, 3-phenylrhodanine, 3-(3-dimethylaminopropyl)rhodanine, and 3-carboxymethylrhodanine, hydantoin (e.g., 1,3-diethylhydantoin and 3-ethyl-1-phenylhydantoin), 2-thiohydantoin (e.g., 1-ethyl-3-phenyl-2-thiohydantoin, 3-heptyl-1-phenyl-2-thiohydantoin, and arylsulfonyl-2-thiohydantoin), 2-pyrazolin-5-one, such as 3-methyl-1-phenyl-2-pyrazolin-5-one, 3-methyl-1-(4-carboxybutyl)-2-pyrazolin-5-one, and 3-methyl-2-(4-sulfophenyl)-2-pyrazolin-5-one, 2-isoxazolin-5-one (e.g., 3-phenyl-2-isoxazolin-5-one), 3,5-pyrazolidindione (e.g., 1,2-diethyl-3,5-pyrazolidindione and 1,2-diphenyl-3,5-pyrazolidindione), 1,3-indandione, 1,3-dioxane-4,6-dione, 1,3-cyclohexanedione, barbituric acid (e.g., 1-ethylbarbituric acid and 1,3-diethylbarbituric acid), and 2-thiobarbituric acid (e.g., 1,3-diethyl-2-thiobarbituric acid and 1,3-bis(2-methoxyethyl)-2-thiobarbituric acid).

Useful hemicyanine dyes are essentially similar to the merocyanine dyes described above, differing only in substituting for the keto methylene group of Formula 34 the group shown below in Formula 35.

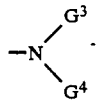

Formula 35 where
- G³ and G⁴ may be the same or different and may represent alkyl, substituted alkyl, aryl, substituted aryl, or aralkyl, as illustrated for ring substituents in Formula 1 or G³ and G⁴ taken together complete a ring system derived from a cyclic secondary amine, such as pyrrolidine, 3-pyrrolidine, piperidine, piperazine (e.g., 4-methylpiperazine and 4-phenylpiperazine), morpholine, 1,2,3,4-tetrahydroquinoline, decahydroquinoline, 3-azabicyclo[3,2,2]nonane, indoline, azetidine, and hexahydroazepine.

Useful hemioxonol dyes exhibit a keto methylene nucleus as shown in Formula 34 and a nucleus as shown in Formula 35 joined by a methine linkage as previously described containing one or a higher uneven number of methine groups.

Useful merostyryl dyes exhibit a keto methylene nucleus as shown in Formula 34 and a nucleus as shown in Formula 36 joined by a methine linkage as described above containing one or a higher uneven number of methine groups.

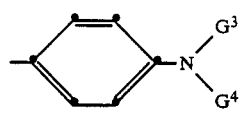

Formula 36 where
G³ and G⁴ are as previously defined.

The cyanine, merocyanine, hemicyanine, hemioxonol, and merostyryl dyes described above are intended to be illustrative of the simpler structural forms of useful polymethine dyes. It is generally recognized that substituents can join the nuclei and methine linkages to form additional cyclic structures. Further, the dyes can contain three or more nuclei. For example, by substituting a merocyanine dye in its methine linkage with a second basic heterocyclic nucleus of the cyanine dye type an allopolar cyanine dye can be formed. Further, the various substituents not forming a part of the dye chromophore can be varied as desired to tailor dye physical properties, particularly hydrophobicity and hydrophillicity, to suit the particular film forming components employed. By choosing as the aliphatic moieties of the dyes hydrocarbon groups having more carbon atoms (e.g., from about 6 to 20 carbon atoms) the dyes can be rendered more oleophilic while hydrocarbon groups containing fewer numbers of carbon atoms (e.g., 1 to 5 carbon atoms) and particularly those bearing polar substituents render the dyes more hydrophilic. The aromatic moieties of the dyes typically contain from 6 to 10 carbon atoms.

When employing as coinitiators azinium activators and dye photosensitizers, the azinium activator is preferably present in a concentration of from $2 \times 10^{-5}$ to $25 \times 10^{-5}$, most preferably from about $5 \times 10^{-5}$ to $20 \times 10^{-5}$, mole per gram of the binder precursor.

The photosensitizer can be present in any concentration capable of increasing the response of the binder precursor composition including the activator to visible light. While the photosensitizer concentration can vary widely, it is generally contemplated to employ photosensitizer in concentrations ranging from about $5 \times 10^{-7}$ to $1 \times 10^{-4}$ mole per gram of binder precursor. Preferred photosensitizer concentrations are in the range of from $10^{-6}$ to $5 \times 10^{-5}$ mole per gram of binder precursor, with optimum concentrations generally being in the range of from about $2 \times 10^{-6}$ to $2 \times 10^{-5}$ mole per gram of binder precursor.

Upon polymerization the photocrosslinking moieties L¹ are converted to crosslinking moieties L which form polymeric backbones. Since each molecular dipole includes at least two crosslinking moieties L, a rigid crosslinked polymeric matrix is created.

One of the significant advantages of the present invention is the high hyperpolarizability densities which can be realized. The optically active transmission medium can consist entirely of repeating units formed by the molecular dipoles. In the preferred form of the invention only very small residues of polymerization initiators are also present. Their concentrations are usually so small, however, as to have no significant effect on the optical or physical properties of the optically active transmission medium.

While not required or preferred, it is recognized, nevertheless, that the optically active transmission medium can, if desired, contain materials other than the molecular dipole repeating units. For example, to facilitate spin casting of the dipole monomers or otherwise improve rheological properties, minor amounts of another material such as a solvent used to reduce viscosity or a linear polymeric binder used to increase viscosity can be present. A liquid solvent when incorporated can usually be removed by evaporation before polymerization. Linear polymeric binders can be retained to form polymer blends, which be chosen to tailor the physical or optical properties of the transmission medium for optimum utility. To minimize reduction of hyperpolarizability densities attributable to the incorporation of a linear polymer, the linear polymer can itself contain molecular dipoles which can be poled.

It is also recognized that other photoactivated monomers can be incorporated to form differing repeating units in the crosslinked polymer matrix, if desired. Because of their superior properties, including exceptionally high levels of optical transparency within the visible portion of the spectrum and ease of handling and polymerizing, preferred binder precursors are $\alpha,\beta$-ethylenically unsaturated monomers. Useful $\alpha,\beta$-ethylenically unsaturated monomers are derived from:

1. polyfunctional aromatic or aliphatic acids such as 1,3,5-benzenetricarboxylic acid, 1,4-benzenedicarboxylic acid, 1,3-benzenedicarboxylic acid, 1,3-naphthalenecarboxylic acid, 1,2,4-benzenetricarboxylic acid, 1,2-benzenedicarboxylic acid, 1,2,3-benzenetricarboxylic acid, 1,2,4,5-benzenetetracarboxylic acid, 1,2,3,5-benzenetetracarboxylic acid, 1,4-cyclohexanedicarboxylic acid, 1,3-cyclohexanedicarboxylic acid, 1,3,5-cyclohexanetricarboxylic acid, 1,2-cyclohexanedicarboxylic acid, 1,2,4-cyclohexanetricarboxylic acid, 1,2,3-cyclohexanetricarboxylic acid, 1,2,4,5-cyclohexanetetracarboxylic acid, 1,2,3,5-cyclohexanetetracarboxylic acid, 1,2,4,5-cyclohexanetetracarboxylic acid and their derivatives.

2. polyfunctional aromatic or aliphatic alcohols such as 1,2,3-benzenetriol, 1,2,4-benzenetriol, 1,3,5-benzenetriol, 1,2-benzenediol, 1,3-benzenediol, 1,4-benzenediol, 1,2,3-cyclohexanetriol, 1,2,4-cyclohexanetriol, 1,3,5-cyclohexanetriol, 1,2-cyclohexanediol, 1,4-cyclohexanediol.

3. polyfunctional polynuclear aromatic or aliphatic alcohols such as hydrogenated bisphenol A, bisphenols with long chain bridges such as butylene, heptylene, hexylene, octadecylene and the like.

4. polyfunctional polynuclear aromatic or aliphatic acids such as phenylindanedicarboxylic acid, hydrogenated phenylindanedicarboxylic acid, 4,4'-isopropylidenedibenzoic acid, 4,4'-isopropylidenedicyclohexanoic acid.

5. and other polymerizable crosslinkable monomers that can be coated with or without a solvent and crosslinked to yield an insoluble film with suitable electrical properties for use as a barrier layer.

The polymerizable crosslinkable monomers prepared from the above polyfunctional nuclei, can be mixed in certain proportion with monofunctional polymerizable monomers to control certain physical properties such as viscosity, flexibility, curing speed, and adhesion.

Useful $\alpha,\beta$-ethylenically unsaturated monofunctional monomers include benzoyloxyethyl acrylate, benzoyloxypropyl acrylate, benzoyloxypentyl acrylate, benzoyloxybutyl acrylate, benzoyloxyhexyl acrylate, benzoyloxyethyl methacrylate, benzoyloxypropyl methacrylate, benzoyloxybutyl methacrylate, benzoyloxypentyl methacrylate and benzoyloxyhexyl methacrylate, phenyl acrylate, phenyl methacrylate, cyclohexyl acrylate, cyclohexyl methacrylate, cyclohexyloyloxethyl acrylate, cyclohexyloyloxypropyl acrylate, cyclohexyloyloxyhexyl acrylate and combinations of these monomers.

Particularly preferred $\alpha,\beta$-ethylenically unsaturated monomers are those having carbonyl-containing substituents. In a specifically preferred form such monomers satisfy Formula 37:

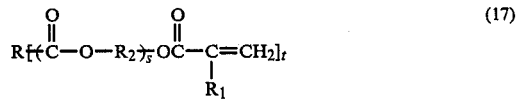 (17)

wherein
R represents a cycloaliphatic (e.g., cyclohexyl) or an aromatic (e.g., naphthyl or phenyl) group;
$R_1$ represents hydrogen or alkyl of from 1 to 6 carbon atoms, preferably hydrogen or methyl;
$R_2$ represents alkylene of 1 to 20 carbon atoms (preferably 1 to 10 carbon atoms), or —CH$_2$CH$_2$(OCH$_2$CH$_2$)r;
r is 1 to 20, preferably 1 to 6;
s is 0 or 1; and
t is 1 to 6, preferably 2 to 4.

Representative examples of such monomers are presented in Table I below.

TABLE I

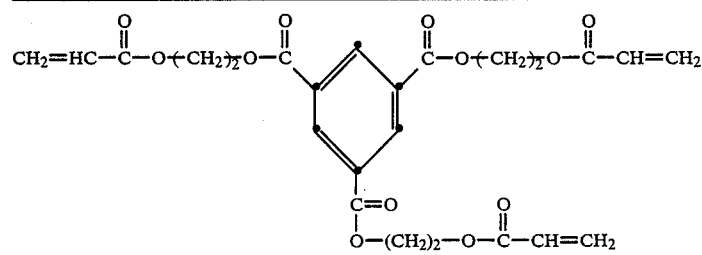

TABLE I-continued
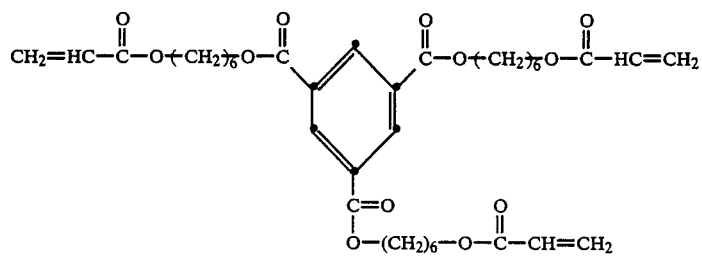
2.
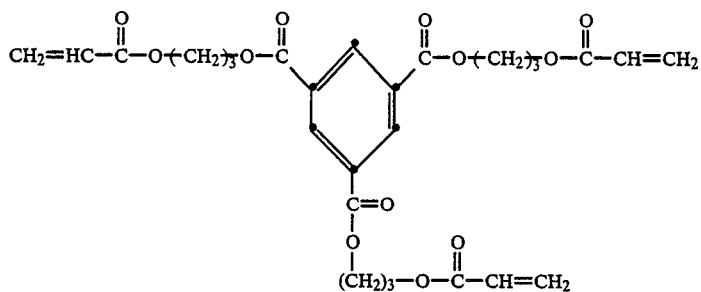
3.
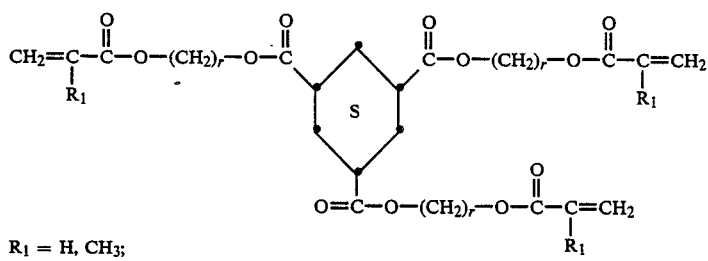
4.
$R_1 = H, CH_3$;
n = one to 6.
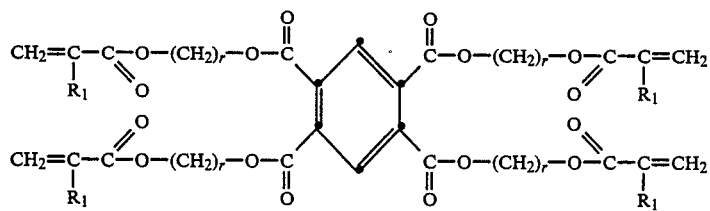
5.
$R_1 = H, CH_3$;
n = one to 6.
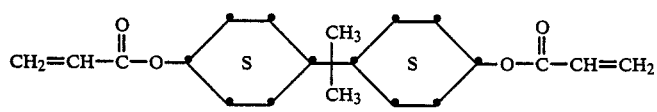
6.
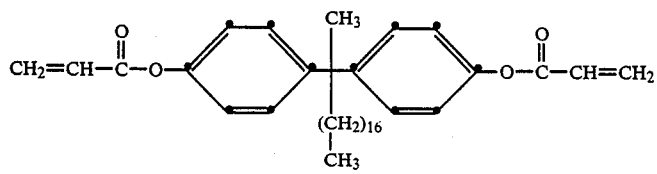
7.

TABLE I-continued

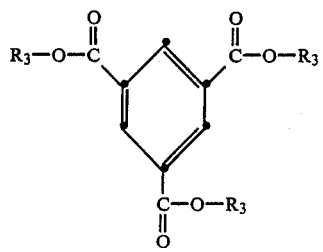

8.

$R_1 = H, CH_3$;
$r = 1$ to $10$;

$$R_3 = CH_2CH_2(OCH_2CH_2)_n-O-\overset{O}{\underset{\|}{C}}-\overset{R_1}{\underset{|}{C}}=CH_2$$

To avoid dissipation of the high hyperpolarizability densities afforded by the present invention, which translate into high second order polarization susceptibilities, molecular dipoles in each instance form at least 50 percent by weight, preferably at least 70 percent, and optimally at least 90 percent, of the optically active transmission medium.

EXAMPLES

The invention can be better appreciated by reference to the following specific embodiments of the invention:

EXAMPLE 1

N,N-Di(6-hydroxyhexyl)aniline) (A1)

A mixture of freshly distilled aniline (93 g, 1.10 mol), potassium carbonate (304 g, 2.2 mol), 6-chloro-1-hexanol (300.0 g, 2.2 mol), and 500 mL of $\eta$-butanol was heated at reflux for 82 hours under nitrogen with vigorous stirring. After cooling and filtering, the butanol was evaporated at reduced pressure to leave a tan oil. The oil was fractionally distilled in vacuo, yielding 205 g (70%) of A1 as a colorless oil, bp 195°-225° C. (0.15 nm).

$^1$H NMR (300 MHz, CDCl$_3$) δ 1.35 (m, 8H), 1.54 (m, 8H), 2.75 (br s, 2H), 3.22 (t, 4H), 3.56 (t, 4H), 6.61 (m, 3H), 7.18 (t, 2H).

EXAMPLE 2

N,N-Di-(6-acetoxyhexyl)aniline (A2)

To a stirred solution of N,N-di-(6-hydroxyhexyl)aniline (A1) (205 g, 0.70 mol) and pyridine (133 g, 1.7 mol) was added acetic anhydride (171 g, 1.7 mol) dropwise at room temperature. After the initial exothermic reaction has subsided, the stirred solution was heated at reflux for 4 hours. After cooling, the solution was poured onto 500 g of ice and the resulting mixture was extracted with four 250 mL portions of dichloromethane. The combined organic extracts were washed three times with 250 mL of water, and dried over anhydrous sodium sulfate. The solvent was removed at reduced pressure and the resulting brown oil was fractionally distilled in vacuo to produce 236 g (90%) of A2 as a slightly yellow oil, bp 220°-230° (0.15 mm).

$^1$H NMR (300 MHz, CDCl$_3$) δ 1.25 (m, 8H), 1.47 (m, 8H), 1.86 (s, 6H), 3.12 (t, 4H), 3.89 (t, 4H), 6.46 (m, 3H), 7.03 (t, 2H).

EXAMPLE 3

4[Di-(6-acetoxyhexyl)amino]benzaldehyde (A3)

N,N-Dimethylformamide (DMF, 250 mL) was added dropwise with stirring under nitrogen to phosphorous oxychloride (115 g, 0.751 mol) at 0° C. The resulting orange solution was stirred for 2 hours, then a solution of 236 g (0.626 mol) of N,N-di-(6-acetoxyhexyl)aniline (A2) in 250 mL of DMF was added slowly. The reaction mixture was stirred under nitrogen for 1 hour at 0° C. and then for 6 hours at 80° C. After cooling, the solution was poured onto 500 g of ice plus 200 g of sodium acetate, and the resulting mixture was extracted with dichloromethane (4×250 mL). The combined organic extracts were washed four times with 250 mL portions of water, dried over anhydrous sodium sulfate, and then concentrated at reduced pressure to produce a light brown oil. The oil was fractionally distilled in vacuo to yield 192 g (76%) of A3 as a gold oil, bp 220°-260° C. (0.007 mm).

$^1$H NMR (300 MHz, CDCl$_3$δ 1.39 (m, 8H), 1.63 (m, 8H), 2.04 (s, 6H), 3.35 (t, 4H), 4.07 (t, 4H), 6.64 (d, 2H), 7.70 (d, 2H), 9.70 (s, 1H).

EXAMPLE 4

4-Nitrobenzyldiethylphosphate (A4)

A two-necked flask equipped for distillation was charged with 77 g (0.46 mol) of triethylphosphite and heated to 60° C. 4-Nitrobenzylbromide was added in small portions with stirring. A vigorous reaction ensued and the liberated bromoethane was continuously distilled from the reaction flask. After addition if the bromide was complete, excess (approximately 20 g) triethylphosphite was added slowly to ensure complete conversion. The resulting brown oil was cautiously distilled in vacuo to yield 115 g (91%) of A4 as a gold oil, bp 155° C. (0.15 mm).

$^1$H NMR (300 MHz, CDCl$_3$ δ 1.26 (t, 6H), 3.25 (d, 2H), 4.05 (dq, 4H), 7.48 (dd, 2H), 8.13 (d, 2H).

EXAMPLE 5

4'-Di-(6-hydroxyhexyl)amino-4-nitrostilbene (A5)

To a stirred suspension of 7.40 g of 60% sodium hydride dispersion (0.185 mol), 50.0 g (0.123 mol) of 4-[di-(6-acetoxyhexyl)amino]benzaldehyde (A3) and 150 mL of dry, freshly distilled 1,2-dimethoxyethane (DME) under nitrogen at room temperature was added 37.1 g (0.136 mol) of 4-nitrobenzyldiethylphosphonate (A4). The mixture immediately turned dark red. After the initial exothermic reaction had subsided, the stirred mixture was heated at reflux for 4 hours under nitrogen, then cooled and poured onto 500 g of ice. The diacetate separated as a red oil, which was collected by extracting with ethyl acetate (4×250 mL), drying the combined extracts over anhydrous sodium sulfate, and concentrating at reduced pressure. The acetate protecting groups were hydrolyzed by refluxing the oil in a mixture of 10 mL concentrated hydrochloric acid, 100 mL of ethanol, and 90 mL of water for 16 hours. After cooling, he solution was neutralized with ammonium hydroxide, and a deep red solid separated. The product was filtered, washed thoroughly with water, and dried. After recrystallization from ethanol, 27.4 g (50%) of A5 was obtained, m.p. 126.5°–128.5° C.

$^1$H NMR (300 MHz, CDCl$_3$) δ 1.41 (m, 10H), 1.60 (m, 8H), 3.31 (t, 4H), 3.66 (t, 4H), 6.63 (d, 2H), 6.89 (d, 1H), 7.19 (d, 1H), 7.41 (d, 2H), 7.55 (d, 2H), 8.16 (d, 2H).

EXAMPLE 6

N,N-Di-(2-acetoxyethyl)aniline (A6)

2,2'-(Phenylimido)diethanol (100 g, 0.552 mol) was treated with acetic anhydride (125 g, 1.22 mol) and pyridine (97.8 g, 1.24 mol) as for A1 in Example 2. The product was distilled in vacuo to provide 126 g (86%) of A6 as a slightly yellow oil, bp 160°–165° C. (0.15 mm).

$^1$H NMR (300 MHz, CDCl$_3$) δ 2.07 (s, 6H), 3.65 (t, 4H), 4.28 (6, 4H), 6.80 (m, 3H), 7.27 (t, 2H).

EXAMPLE 7

4-[Di-(2-acetoxyethyl)amino]benzaldehyde (A7)

N,N-Di-(2-acetoxyethyl)aniline (A6) (126 g, 0.476 mol) was reacted with phosphorous oxychloride (80.3 g, 0.524 mol) in DMF as for A2 in Example 3. The product was distilled at 155°–175° C. (0.15 mm) to yield 130 g (93%) of A7 as an orange oil.

$^1$H NMR (300 MHz, CDCl$_3$ δ 2.00 (s, 6H), 3.68 (t, 4H), 4.23 (t, 4H), 6.77 (d, 2H), 7.68 (d, 2H), 9.70 (s, 1H).

EXAMPLE 8

4'-(Di-2-hydroxyethyl)amino-4-nitrostilbene (A8)

4-[Di-(2-acetoxyethyl)amino]benzaldehyde (A7) (20.0 g, 0.682 mol was reacted with 4.09 g (0.102 mol) of 60% sodium hydride dispersion and 20.5 g (0.075 mol) of 4-nitrobenzyldiethylphosphonate (A4) as for A3 in Example 5. The initial product was hydrolyzed as before, producing dark red crystals of A8 after recrystallization from 10% alcoholic pyridine. Yield 13.7 g (61%). mp 181°–3° C.

$^1$H NMR (300 MHz, (CD$_3$)$_2$SO) δ 3.45 (t, 4H), 3.54 (t, 4H), 4.78 (t, 2H), 6.73 (d, 2H), 7.06 (d, 1H), 7.38 (d, 1H), 7.45 (d, 2H), 7.72 (d, 2H), 8.15 (d, 2H). $^{13}$C{$^1$H} NMR (75.5 MHz, (CD$_3$)$_2$SO) δ 53.1, 58.1, 111.4, 120.6, 123.2, 124.0, 126.1, 128.6, 133.9, 145.0, 145.2 148.6.

EXAMPLE 9

4'-(Di-6-acryloyloxyhexyl)amino-4-nitrostilbene (A9)

To a stirred solution of 4'-di-(6-hydroxyhexyl)amino-4-nitrostilbene (A5) (2.07 g, 4.61 mmol), dry triethylamine (1.19 g, 11.7 mmol), 50 mL of dry dichloromethane, and 30 mg of hydroquinone at 0° C. under nitrogen as added dropwise a solution of 1.07 g (11.7 mmol) of freshly distilled acryloyl chloride in 10 mL of dichloromethane. The reaction mixture was stirred for 1 hour at 0° C. and then for 16 hours at 25° C. The solution was washed twice with saturated sodium bicarbonate (50 mL) and twice with brine (50 mL). After drying (MgSO$_4$) and removal of solvent at reduced pressure, a dark red oil was deposited. The product was purified by column chromatography on silica gel using dichloromethane as eluent. Actual yield was impossible to measure because the product began to polymerize spontaneously when all the solvent was removed.

$^1$H NMR (300 MHz, CDCl$_3$) δ 1.38 (m, 8H), 1.65 (m, 8H), 3.28 (t, 4H), 4.14 (t, 4H), 5.80 (dd, 2H), 6.11 (m, 2H), 6.38 (dd, 2H), 6.66 (d, 2H), 6.87 (d, 1H), 7.17 (d, 1H), 7.38 (d, 2H), 7.57 (d, 2H), 8.13 (d, 2H). $^{13}$C{$^1$H} NMR (75.5 MHz, CDCl$_3$) δ 25.8, 26.7, 27.2, 28.6, 50.9, 64.4, 111.6, 121.0, 122.3, 123.4, 124.1, 125.9, 128.6, 133.6, 144.9, 145.7, 148.5, 166.2.

EXAMPLE 10

4'-(Di-6-methacryloyloxyhexyl)amino-4-nitrostilbene (A10)

4'-Di-(6-hydroxyhexyl)amino-4-nitrostilbene (A5) (2.43 g, 5.52 mmol) was reacted with freshly distilled methacryloyl chloride and triethylamine under the same conditions as in Example 9. The product was purified by column chromatography on silica gel using dichloromethane as eluent. A red oil was obtained, but the yield could not be determined because the compound tended to polymerize spontaneously when all the solvent was removed.

$^1$H NMR (300 MHz, CDCl$_3$) δ 1.39 (m, 8H), 1.68 (m, 8H), 1.92 (s, 6H), 3.29 (t, 4H), 4.13 (t, 4H), 5.53 (s, 2H), 6.08 (s, 2H), 6.60 (d, 2H), 6.68 (d, 2H), 7.17 (d, 1H), 7.38 (d, 1H), 7.52 (d, 2H), 8.14 (d, 2H). $^{13}$C{$^1$H} NMR (75.5 MHz, CDCl$_3$) δ 18.3, 25.9, 26.8, 27.2, 28.6, 50.9, 64.6, 111.6, 121.0, 123.4, 124.1, 125.2, 126.0, 128.6, 133.7, 136.5, 145.1, 145.8, 148.6, 167.5.

EXAMPLE 11

4'-(Di-2-methacryloyloxyethyl)amino-4-nitrostilbene (A11)

4'-Di-(6-hydroxyhexyl)amino-4-nitrostilbene (A8) (2.43 g, 5.52 mmol) was reacted with freshly distilled methacryloyl chloride and triethylamine under the same conditions as in Example 10. The product was purified by column chromatography on silica gel using dichloromethane as eluent. A red oil was obtained which gradually crystallized (mp 81°–3° C.), but the yield could not be determined because the compound tended to polymerize spontaneously when all the solvent was removed.

$^1$H NMR (300 MHz, CDCl$_3$) δ 1.93 (s, 6H), 3.73 (t, 4H), 4.35 (t, 4H), 5.58 (s, 2H), 6.09 (s, 2H), 6.82 (d, 2H), 6.92 (d, 1H), 7.18 (d, 1H), 7.44 (d, 2H), 7.56 (d, 2H), 8.16 (d, 2H). $^{13}$C{$^1$H} NMR (75.5 MHz, CDCl$_3$) δ 18.3, 49.6, 61.6, 112.2, 122.2, 124.1, 135.2, 126.0, 126.1, 128.6, 133.2, 144.8, 146.0, 147.9, 167.2.

EXAMPLE 12

4-Methylmercaptobenzyl chloride (A12)

To a stirred solution of 154 g (1 mol) of 4-methylmercaptobenzyl alcohol in 1 liter of dry bensene was added dropwise 80 mL 1.1 mol) of thionyl chloride. The mixture immediately turned blue. After the addition of the thionyl chloride was completed, the mixture was heated at reflux for 2 hours. After cooling the benzene and excess thionyl chloride were distilled at ambient pressure. The product was distilled in vacuo at 105° C. (0.5 mm), to yield 160 g (93%) of a colorless liquid.

¹NMR (300 MHz, CDCl₃, δ 2.49 (s, 3H), 4.57 (s, 2H), 7.28 (dd, 4H).

EXAMPLE 13

Diethyl 4-Methylmercaptobenzylphosphonate (A13)

4-Methylmercaptobenzyl chloride (A12) (160 g, 0.94 mol) was added dropwise, under nitrogen, with stirring to 183 g (1.1 mole) of triethylphosphite which was heated at reflux. When the addition of the 4-methylmercaptobenzyl chloride was completed, the mixture was refluxed for additional 4 hours. The product was distilled in vacuo to yield 229 g (89%) of water clear, viscous liquid bp 142°–145° C. (0.025 mm).

¹H NMR (300 MHz, CDCl₃), δ 1.27 (t, 6H), 2.49 (s, 3H), 3.13 (d, 2H), 4.04 (quintet, 4H), 7.66 (dd, 4H).

EXAMPLE 14

Diethyl 4-Methylsulfonlbenzylphosphonate (A14)

To a stirred solution of 174 g (0.6 mole) of diethyl 4-methylmercaptobenzylphosphonate (A13) in 500 mL of glacial acetic acid was added dropwise 171 g (1.5 moles) of hydrogen peroxide (30% in water). The mixture was heated at reflux for 2 hours. After cooling, the water and acetic acid were removed under reduced pressure and the residue was distilled to yield 121 g (66%) of very viscous liquid bp 214°–216° C. ($2\times10^{-4}$ mm).

¹H NMR (300 MHz, CDCl₃) δ 1.23 (t, 6H), 3.01 (s, 3H), 3.19 (d, 2H), 4.02 (quintet, 4H), 7.66 (dd, 4H).

EXAMPLE 15

4'-(Di-6-methacryloyloxyhexyl)amino-4-methylsulfonylstilbene (A15)

4'-Di-(6-hydroxyhexyl)amino-4-methylsulfonylstilbene (10.0 g, 21.1 mmol) was reacted with freshly distilled methacryloyl chloride and triethylamine under the same conditions as in Example 10. The product was purified by column chromatography on silica gel using dichloromethane as eluent. A yellow oil was obtained, but the yield could not be determined because the compound tended to polymerize spontaneously when all the solvent was removed.

¹H NMR (300 MHz, CDCl₃ δ 1.21 (m, 8H), 1.65 (m, 8H), 1.98 (s, 6H), 3.09 (s, 3H), 3.34 (t, 4H), 4.16 (t, 4H), 5.55 (s, 2H), 6.10 (s, 2H), 6.62 (d, 2H), 6.90 (d, 1H), 7.09 (d, 1H), 7.40 (d, 2H), 7.61 (d, 2H), 7.89 (d, 2H).

EXAMPLE 16

Poled film prepared from 4'-Di-(6-acryloyloxyhexyl)amino-4-nitrostilbene (A10)

A composition was prepared for spin casting of the following formula:

| | |
|---|---|
| 0.63 gm | A5 |
| 0.01 gm | Photosensitizer (B1) |
| 0.075 gm | Activator (B2) |
| 2 ml | Dichloromethane | where
B2 was 1-methoxy-4-pyridinium tetrafluoroborate
and
B1 was

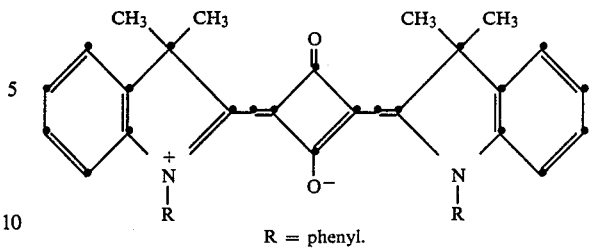

R = phenyl.

Using a syringe the solution was placed between transparent indium tin oxide (ITO) electrodes deposited on optical flat quartz substrates separated by a 12 μm poly(ethylene terephthalate) spacer. When the gap between the electrodes was filled, a DC voltage of $1.75\times10^5$ V/cm was applied across the electrodes to pole the molecular dipoles. The poled solution was exposed for 45 minutes with a 200 watt mercury vapor lamp to near UV radiation to create an optical article containing an optically active transmission medium comprised of polar aligned molecular dipoles and a crosslinked polymeric binder. Upon removal of the externally applied electric field, the molecular dipoles remained in polar alignment. The transmission medium produced appeared on visual inspection to be transparent and colorless.

$\chi^{(2)}$ was estimated to be in the range of from $5\times10^{-9}$ to $1\times10^{-8}$ esu.

EXAMPLE 17

Poled film prepared from 4'-(Di-6-methacryloyloxyhexyl)amino-4-methylsulfonylstilbene (A15)

A composition was prepared for spin casting of the following formula:

| | |
|---|---|
| 0.45 gm | A15 |
| 0.010 gm | Photosensitizer (B1) |
| 0.070 gm | Activator (B2) |
| 2 ml | Dichloromethane | where B1 and B2 are as defined in Example 16.

The solution was spin cast at 250 rpm onto 250 μm gap side-by-side chromium electrodes on a clear plastic support by first thoroughly wetting the support and electrode surfaces with the solution before spinning. An electric field of $8\times10^4$ V/cm was placed across the film and held for 4 hours while crosslinking occurred as the result of exposure to room light, since the photosensitizer exhibited a peak absorption at 532 nm.

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a second order polarization susceptibility greater than $10^{-9}$ electrostatic units comprised of organic polar aligned noncentrosymmetric molecular dipoles having an electron donor moiety linked through a conjugated π bonding system to an electron acceptor moiety to permit oscillation of the molecular dipole between a ground state exhibiting a first dipole moment and an excited state exhibiting a differing dipole moment, characterized in that the molecular dipoles form repeating units in a crosslinked polymeric matrix.

2. An optical article according to claim 1 further characterized in that means are provided for directing electromagnetic radiation to said transmission medium.

3. An optical article according to claim 1 further characterized in that biasing means are provided for placing an electric field across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that said molecular dipole repeating units form at least 50 percent of said transmission medium.

7. An optical article according to claim 6 further characterized in that said molecular dipole repeating units form at least 70 percent of said transmission medium.

8. An optical article according to claim 1 further characterized in that said molecular dipole repeating units are crosslinked by

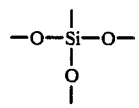

crosslinking moieties.

9. An optical article according to claim 1 further characterized in that said molecular dipole repeating units satisfy the formula:

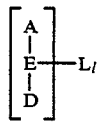
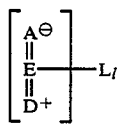

where
A is an electron acceptor moiety;
D is an electron donor moiety;
E is a conjugated π bonding system;
l is an integer of from 1 to 4; and
L is a crosslinking moiety.

10. An optical article according to claim 9 further characterized in that A is a cyano, nitro, or sulfonyl electron acceptor moiety.

11. An optical article according to claim 9 further characterized in that D is an amino moiety.

12. An optical article according to claim 11 further characterized in that D is a secondary or tertiary amino moiety.

13. An optical article according to claim 9 further characterized in that A and E together form a sulfonimino moiety.

14. An optical article according to claim 9 further characterized in that D and E together form a pyridinium moiety.

15. An optical article according to claim 9 futher characterized in that L is a crosslinking moiety of the formula

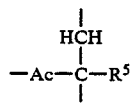

where
Ac is an activating moiety and
$R^5$ is hydrogen or a lower alkyl group of from 1 to 6 carbon atoms.

16. An optical article according to claim 9 further characterized in that said molecular dipole repeating units satisfy one or combination of the formulae:

(a)

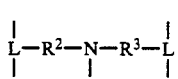

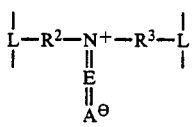

(b)

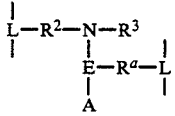

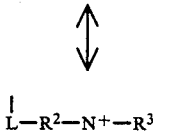

(c)

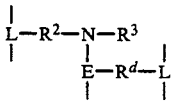

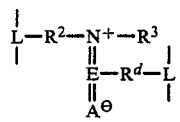

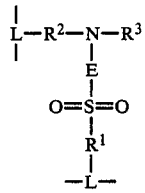

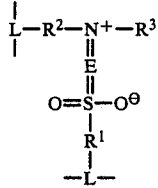

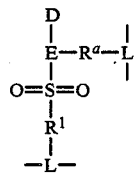

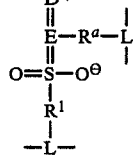

(e)

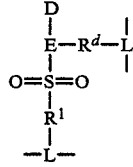

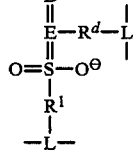

(f)

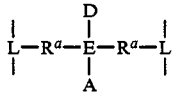

(g)

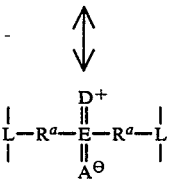

(d)

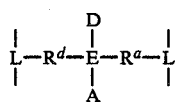

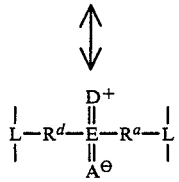

(h)

(i)

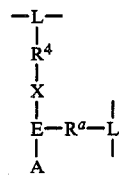

(j)

17. An optical article according to claim 16 further characterized in that E is chosen to provide a 4,4'-stilbenoid conjugated $\pi$ bonding system.

18. An optical article according to claim 17 further characterized in that E is chosen to provide a 4,4'-stilbene conjugated $\pi$ bonding system.

19. An optical article according to claim 9 further characterized in that said molecular dipole repeating units are comprised of one or a combination of repeating units satisfying the formulae:

(a)
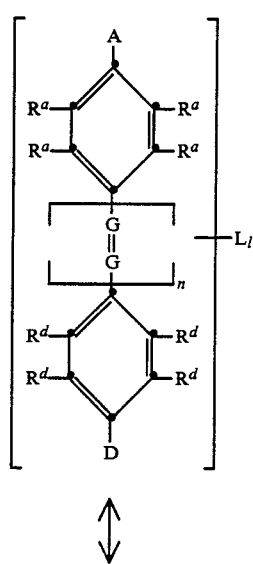
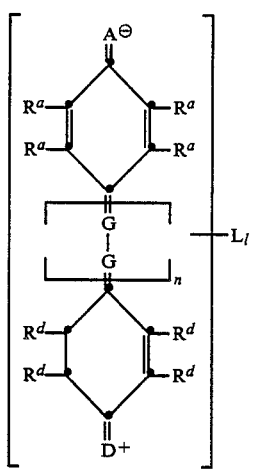
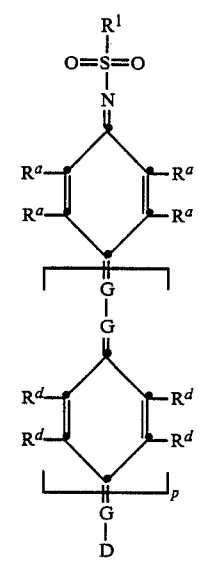
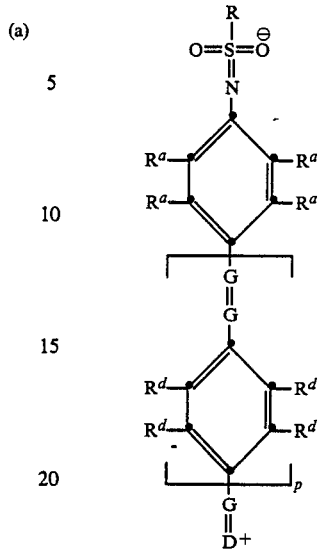
(b)
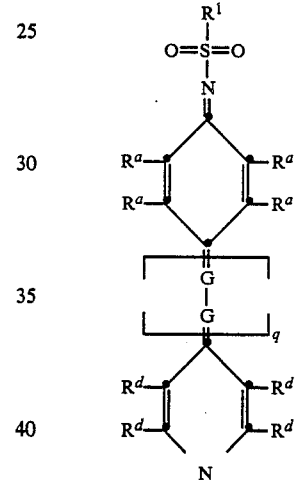
(c)
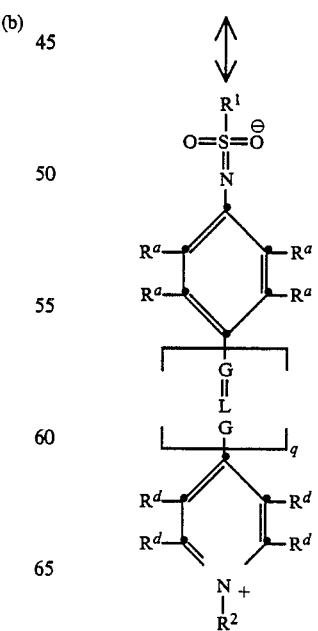

where
- A is an electron acceptor moiety;
- D is an electron donor moiety;
- G is independently in each occurrence a methine or aza moiety, with the proviso that no more than two aza moieties are next adjacent;
- l is 2 or 3;
- L is a crosslinking moiety;
- n is an integer of from 1 to 3;
- p is 0 or 1;
- q is an integer of from 0 to 3;
- $R^a$ is chosen from the group consisting of hydrogen and substituents which collectively, together with A, $-SO_2R^1$, or $=NSO_2R^1$, enhance the electron acceptance of the aromatic ring to which they are attached; and
- $R^d$ is chosen from the group consisting of hydrogen and substituents which collectively, together with D, $R^2R^3N-$, or $-R^2$, enhance the electron donation of the aromatic ring to which they are attached.

20. An optical article according to claim 19 further characterized that $R^a$ and $R^d$ are hydrogen in each occurrence, L is linked to at least one of oxygen, sulfur, and nitrogen atoms of the electron acceptor and donor moieties through an alkylene spacer containing from 2 to 10 carbon atoms, and L is present in the form of crosslinking groups of the formula:

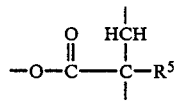

where
$R^5$ is hydrogen or methyl.

* * * * *